United States Patent
Miyagawa et al.

(10) Patent No.: US 9,014,089 B2
(45) Date of Patent: Apr. 21, 2015

(54) MANAGEMENT APPARATUS, CONTROL APPARATUS, COMMUNICATION SYSTEM, CONTROL METHOD AND PROGRAM

(75) Inventors: Yusuke Miyagawa, Minato-ku (JP); Takayuki Kido, Minato-ku (JP); Takeshi Nishimura, Minato-ku (JP); Yasuhiro Watanabe, Minato-ku (JP); Hiroaki Akiyama, Minato-ku (JP)

(73) Assignee: NEC Corporation, Tokyo (JP)

( * ) Notice: Subject to any disclaimer, the term of this patent is extended or adjusted under 35 U.S.C. 154(b) by 157 days.

(21) Appl. No.: 13/501,545

(22) PCT Filed: Nov. 1, 2010

(86) PCT No.: PCT/JP2010/069427
§ 371 (c)(1),
(2), (4) Date: Apr. 12, 2012

(87) PCT Pub. No.: WO2011/065190
PCT Pub. Date: Jun. 3, 2011

(65) Prior Publication Data
US 2012/0201203 A1    Aug. 9, 2012

(30) Foreign Application Priority Data
Nov. 25, 2009 (JP) .................... 2009-267494

(51) Int. Cl.
*H04W 4/00* (2009.01)
*H04M 3/22* (2006.01)
(Continued)

(52) U.S. Cl.
CPC ............. *H04M 3/2281* (2013.01); *H04L 63/30* (2013.01); *H04W 12/02* (2013.01);
(Continued)

(58) Field of Classification Search
CPC ........ H04B 17/00; H04L 63/00; H04L 63/30; H04L 65/1016; H04L 12/26; H04L 12/56; H04L 12/5692; H04M 3/2281; H04M 2207/18; H04M 7/006; H04W 24/02; H04W 28/08; H04W 84/045; H04W 92/045; H04W 92/12
USPC .............. 370/352, 396, 395.5, 390, 432, 235, 370/250, 328; 379/35, 32.01, 229, 211.02, 379/230, 219; 455/466, 450, 67.1, 411, 455/424, 561, 436, 414.1, 433; 709/224, 709/227
See application file for complete search history.

(56) References Cited

U.S. PATENT DOCUMENTS

2003/0101356 A1* 5/2003 Miettinen et al. ............. 713/201
2004/0157629 A1* 8/2004 Kallio et al. .................. 455/466
(Continued)

FOREIGN PATENT DOCUMENTS

CN    101194523 A    6/2008
EP    1 528 774 A1    5/2005
(Continued)

OTHER PUBLICATIONS

"3GPP TS 23.228 v9.0.0, 3$^{rd}$ Generation Partnership Project; Technical Specification Group Services and System Aspects; IP Multimedia Subsystem (IMS); Stage 2 (Release 9)", Jun. 2009, 1-250 pages.
(Continued)

*Primary Examiner* — Bob Phunkulh
*Assistant Examiner* — Rose Clark
(74) *Attorney, Agent, or Firm* — Sughrue Mion, PLLC

(57) ABSTRACT

When accepting an establishment request (Cx-LIR) for establishing an information communication path between a sending-side UE and a receiving-side UE, an HSS performs control so as to establish the information communication path between the sending-side UE and the receiving-side UE via an MGW and an existing 3G network if the receiving-side UE exists in an IMS network and is a communication interception target terminal.

10 Claims, 9 Drawing Sheets

(51) Int. Cl.
*H04L 29/06* (2006.01)
*H04W 12/02* (2009.01)
*H04W 8/12* (2009.01)
*H04W 48/00* (2009.01)

(52) U.S. Cl.
CPC ....... *H04L 65/1016* (2013.01); *H04L 65/1069* (2013.01); *H04L 65/103* (2013.01); *H04M 2207/20* (2013.01); *H04L 65/605* (2013.01); *H04W 8/12* (2013.01); *H04W 48/17* (2013.01)

(56) References Cited

U.S. PATENT DOCUMENTS

| | | | |
|---|---|---|---|
| 2006/0217136 A1* | 9/2006 | Bantukul et al. | 455/466 |
| 2008/0102794 A1 | 5/2008 | Keevill et al. | |
| 2008/0102866 A1* | 5/2008 | Fiorillo et al. | 455/466 |
| 2008/0144615 A1 | 6/2008 | Casey | |
| 2009/0074156 A1* | 3/2009 | Ku et al. | 379/35 |
| 2009/0156213 A1* | 6/2009 | Spinelli et al. | 455/436 |
| 2009/0232128 A1* | 9/2009 | Paulis et al. | 370/352 |
| 2012/0044908 A1 | 2/2012 | Spinelli et al. | |

FOREIGN PATENT DOCUMENTS

| | | |
|---|---|---|
| JP | 2008-270899 A | 11/2008 |
| JP | 2009-504049 A | 1/2009 |
| JP | 2009-504051 A | 1/2009 |
| JP | 2009-088959 A | 4/2009 |
| JP | 2010-045564 A | 2/2010 |
| WO | 02/093838 A1 | 11/2002 |
| WO | 2007015075 A1 | 2/2007 |

OTHER PUBLICATIONS

Communication dated Dec. 5, 2013, issued by the European Patent Office in corresponding Application No. 10833037.4.

Office Action dated Mar. 6, 2014, issued by the State Intellectual Property of the P.R.C. in corresponding Chinese Application No. 201080053442.2.

\* cited by examiner

MANAGEMENT APPARATUS, CONTROL APPARATUS, COMMUNICATION SYSTEM, CONTROL METHOD AND PROGRAM

TECHNICAL FIELD

The present invention relates to communication interception of an IMS (IP Multimedia Subsystem) network.

BACKGROUND ART

Recently, development of a communication system introducing a base station for femtocells has been promoted in order to improve the quality of a communication area (for example, see Patent Literatures 1 and 2).

The base station for femtocells is a small-sized wireless base station which covers a small communication area having a diameter of several tens of meters, and which is installed inside a room of a home or office for the purpose of covering the communication area in the room. Thereby, it becomes possible to improve the communication quality of a communication area which cannot be covered by an existing base station for macrocells. Furthermore, it also becomes possible to cover the communication area without spending a lot of money for maintenance of the infrastructure for the base station for macrocells.

A communication system introducing the base station for femtocells is constructed with an IMS network on the basis of the stipulations by 3GPP (3rd Generation Partnership Project). An IMS network communication technique is disclosed, for example, in Non-Patent Literature 1.

CITATION LIST

Patent Literature

Patent Literature 1: JP2009-504049A
Patent Literature 2: JP2009-504051A
Patent Literature 3: JP2008-270899A
Patent Literature 4: JP2009-88959A

Non-Patent Literature

Non-Patent Literature 1: 3GPP TS 23.228 V9.0.0 (June 2009)

SUMMARY OF THE INVENTION

Technical Problem

Though a communication interception function is provided in existing 3G (Macro) networks, it is not possible to provide the communication interception function provided in the existing 3G networks, in existing IMS networks. This is because, in the case of communication closed in an existing IMS network, it is a standard form that voice communication between IMS terminals (an RTP (Real-time Transport Protocol) stream) is connected directly between the terminals without passing through some kind of apparatus, and means for extracting an interception target voice at a standard IMS node is not defined.

Therefore, in a communication system introducing a base station for femtocells and constructed with an IMS network also, it is not possible to realize a communication interception function similar to the communication interception function provided in the existing 3G networks at present.

Actually, however, there may occur a situation in which voice communication between IMS terminals has to be intercepted. Therefore, it is necessary to realize a communication interception function similar to the communication interception function provided in the existing 3G networks, in an IMS network also.

For example, Patent Literatures 3 and 4 disclose techniques enabling communication interception even in the case where communication by SIP (Session Initiation Protocol) is performed.

In the technique disclosed in the Patent Literature 3, when receiving a request to start communication interception from a communication interception apparatus, a SIP server transmits a switching request for transmitting and receiving data via the communication interception apparatus, to a mobile phone. When receiving the switching request, the mobile phone changes the transmission destination to be a relay station for relaying voice data, to the communication interception apparatus, and transmits voice data via the communication interception apparatus. Thereby, the communication interception apparatus makes it possible to intercept voice data transmitted and received between mobile phones while relaying the voice data.

In the technique disclosed in Patent Literature 4, when a server accepts an INVITE message and the terminal which has transmitted the INVITE message is an interception-specified terminal, the server transmits the INVITE message to a cipher terminating apparatus to transmit the INVITE message to a counterpart terminal via a cipher terminating apparatus. Then, cryptographic communication is established between the interception-specified terminal and the cipher terminating apparatus, and cryptographic communication is established between the terminal and the cipher terminating apparatus so that an unencrypted signal can be intercepted between the cipher terminating apparatuses.

In the technique disclosed in Patent Literature 3, communication interception is enabled by a mobile phone which has accepted a switching request changing a transmission destination to be a relay station for relaying voice data, to a communication interception apparatus and transmitting voice data via the communication interception apparatus. Therefore, a mobile phone is required to perform the switching process, and the load on the mobile phone increases. Furthermore, there is a possibility that the mobile phone can recognize that communication interception is being performed.

In the technique disclosed in Patent Literature 4, communication interception is enabled without implementing a new function on a terminal (without performing a switching process). However, the technique disclosed in Patent Literature 4 is based on the assumption of a case where the system disclosed in Patent Literature 4 is constructed alone, and mutual connection between the system configuration disclosed in Patent Literature 4 and a different existing system configuration (for example, an existing 3G network) and the like are not considered at all.

Thus, in Patent Literature 1 to 4, there is no description nor suggestion about the point of, taking into consideration the mutual connection with an existing 3G network, realizing a communication interception function similar to the communication interception function provided in the existing 3G network, in an IMS network.

The present invention has been made in view of the above situation, and its object is to provide a management apparatus, control apparatus, communication system, control method and program capable of, taking into consideration the mutual connection with an existing 3G network, realizing a communication interception function similar to the communication interception function provided in the existing 3G network, in an IMS network, which is the problem described above.

Solution to Problem

In order to achieve the object, the present invention has the following characteristics.

<Management Apparatus>

A management apparatus according to the present invention is a management apparatus managing information about a communication terminal existing in an IMS (IP Multimedia Subsystem) network, comprising:

a control section which, when accepting an establishment request for establishing an information communication path between a sending-side communication terminal and a receiving-side communication terminal, performs control so as to establish the information communication path between the sending-side communication terminal and the receiving-side communication terminal via a relay apparatus provided with a relay function for relaying communication between the IMS network and a 3G network, and provided with a communication interception function, and via the 3G network if the receiving-side communication terminal exists in the IMS network and is a communication interception target terminal.

<Control Apparatus>

A control apparatus according to the present invention is a control apparatus controlling communication of communication terminals existing in an IMS (IP Multimedia Subsystem) network, comprising:

a control section which, when accepting an establishment request for establishing an information communication path between a sending-side communication terminal and a receiving-side communication terminal, performs control so as to establish the information communication path between the sending-side communication terminal and the receiving-side communication terminal via a relay apparatus provided with a relay function for relaying communication between the IMS network and a 3G network, and provided with a communication interception function, and via the 3G network if the sending-side communication terminal is a communication interception target terminal.

<Communication System>

A communication system according to the present invention is a communication system configured to comprise at least communication terminals, a management apparatus managing information about a communication terminal existing in an IMS (IP Multimedia Subsystem) network, and a relay apparatus provided with a relay function of relaying communication between the IMS network and a 3G network, and a communication interception function, wherein the management apparatus comprises a control section which, when accepting an establishment request for establishing an information communication path between a sending-side communication terminal and a receiving-side communication terminal, performs control so as to establish the information communication path between the sending-side communication terminal and the receiving-side communication terminal via the relay apparatus and the 3G network if the receiving-side communication terminal exists in the IMS network and is a communication interception target terminal.

A communication system according to the present invention is a communication system configured to comprise at least communication terminals, a control apparatus controlling communication of communication terminals existing in an IMS (IP Multimedia Subsystem) network, and a relay apparatus provided with a relay function of relaying communication between the IMS network and a 3G network, and a communication interception function, wherein the control apparatus comprises a control section which, when accepting an establishment request for establishing an information communication path between a sending-side communication terminal and a receiving-side communication terminal, performs control so as to establish the information communication path between the sending-side communication terminal and the receiving-side communication terminal via the relay apparatus and the 3G network if the sending-side communication terminal is a communication interception target terminal.

<Control Method>

A control method according to the present invention is a control method by a management apparatus managing information about a communication terminal existing in an IMS (IP Multimedia Subsystem) network, comprising:

a control step of, when accepting an establishment request for establishing an information communication path between a sending-side communication terminal and a receiving-side communication terminal, performing control so as to establish the information communication path between the sending-side communication terminal and the receiving-side communication terminal via a relay apparatus provided with a relay function for relaying communication between the IMS network and a 3G network, and provided with a communication interception function, and via the 3G network if the receiving-side communication terminal exists in the IMS network and is a communication interception target terminal.

A control method according to the present invention is a control method by a control apparatus controlling communication of communication terminals existing in an IMS (IP Multimedia Subsystem) network, comprising:

a control step of, when accepting an establishment request for establishing an information communication path between a sending-side communication terminal and a receiving-side communication terminal, performing control so as to establish the information communication path between the sending-side communication terminal and the receiving-side communication terminal via a relay apparatus provided with a relay function for relaying communication between the IMS network and a 3G network, and provided with a communication interception function, and via the 3G network if the sending-side communication terminal is a communication interception target terminal.

<Program>

A program according to the present invention is a program to be executed by a management apparatus managing information about a communication terminal existing in an IMS (IP Multimedia Subsystem) network, the program causing a computer to execute:

a control process for, when accepting an establishment request for establishing an information communication path between a sending-side communication terminal and a receiving-side communication terminal, performing control so as to establish the information communication path between the sending-side communication terminal and the receiving-side communication terminal via a relay apparatus provided with a relay function for relaying communication between the IMS network and a 3G network, and provided with a communication interception function, and via the 3G network if the receiving-side communication terminal exists in the IMS network and is a communication interception target terminal.

A program according to the present invention is a program to be executed by a control apparatus controlling communication of communication terminals existing in an IMS (IP Multimedia Subsystem) network, the program causing a computer to execute:

a control process for, when accepting an establishment request for establishing an information communication path between a sending-side communication terminal and a receiving-side communication terminal, performing control so as to establish the information communication path between the sending-side communication terminal and the receiving-side communication terminal via a relay apparatus provided with a relay function for relaying communication between the IMS network and a 3G network, and provided with a communication interception function, and via the 3G network if the sending-side communication terminal is a communication interception target terminal.

Advantageous Effects of Invention

According to the present invention, it is possible to, taking into consideration the mutual connection with an existing 3G network, realize a communication interception function similar to the communication interception function provided in the existing 3G network, in an IMS network.

DESCRIPTION OF EMBODIMENTS

First Exemplary Embodiment

<System Configuration Example of Communication System>

First, description will be made on a system configuration example of a first exemplary embodiment of a communication system of the present invention with reference to FIG. 1.

The communication system of this exemplary embodiment is configured to have an existing 3G network (Macro network) and a Femto IMS (IP Multimedia Subsystem) network.

The existing 3G network (Macro network) is a well-known 3G network. The existing 3G network (Macro network) is configured to include UEs (User Equipment) which are communication terminals, Node-B's, an RNCs (Radio Network Controllers), an MSC (Mobile Services Switching Centre), a VLR (Visitor Location Register), a 3G interception terminal, and an HLR/AuC (Home Location Register/Authentication Centre).

Since the UEs, Node-B's, RNCs, MSC, VLR and HLR/AuC constituting the existing 3G network (Macro network) are apparatuses which perform processing in conformity with 3GPP, description of specific processing operations will be omitted here. The techniques used for an existing 3G network (communication system) are disclosed, for example, in 3GPP TS 23.002 V9.10 (September 2009) and the like.

The 3G interception terminal is a terminal which intercepts voice communication which passes through the existing 3G network, and can intercept voice communication which has been intercepted at the MSC, by information about the 3G interception terminal, such as an IP address and a port number, being registered with the MSC.

The Femto IMS network is configured to include FAPs (Femto Access Points), a PDG (Packet Data Gateway), a CSCF (Call Session Control Function), an HSS (Home Subscriber Server), a VLR (Visitor Location Register), an MGCF (Media Gateway Control Function), MGW (Media GateWay) and an IMS interception terminal.

The FAP is a small-sized wireless base station which covers a small communication area having a diameter of several tens of meters.

The PDG is an apparatus which relays an SIP message and the like.

Figure 1:
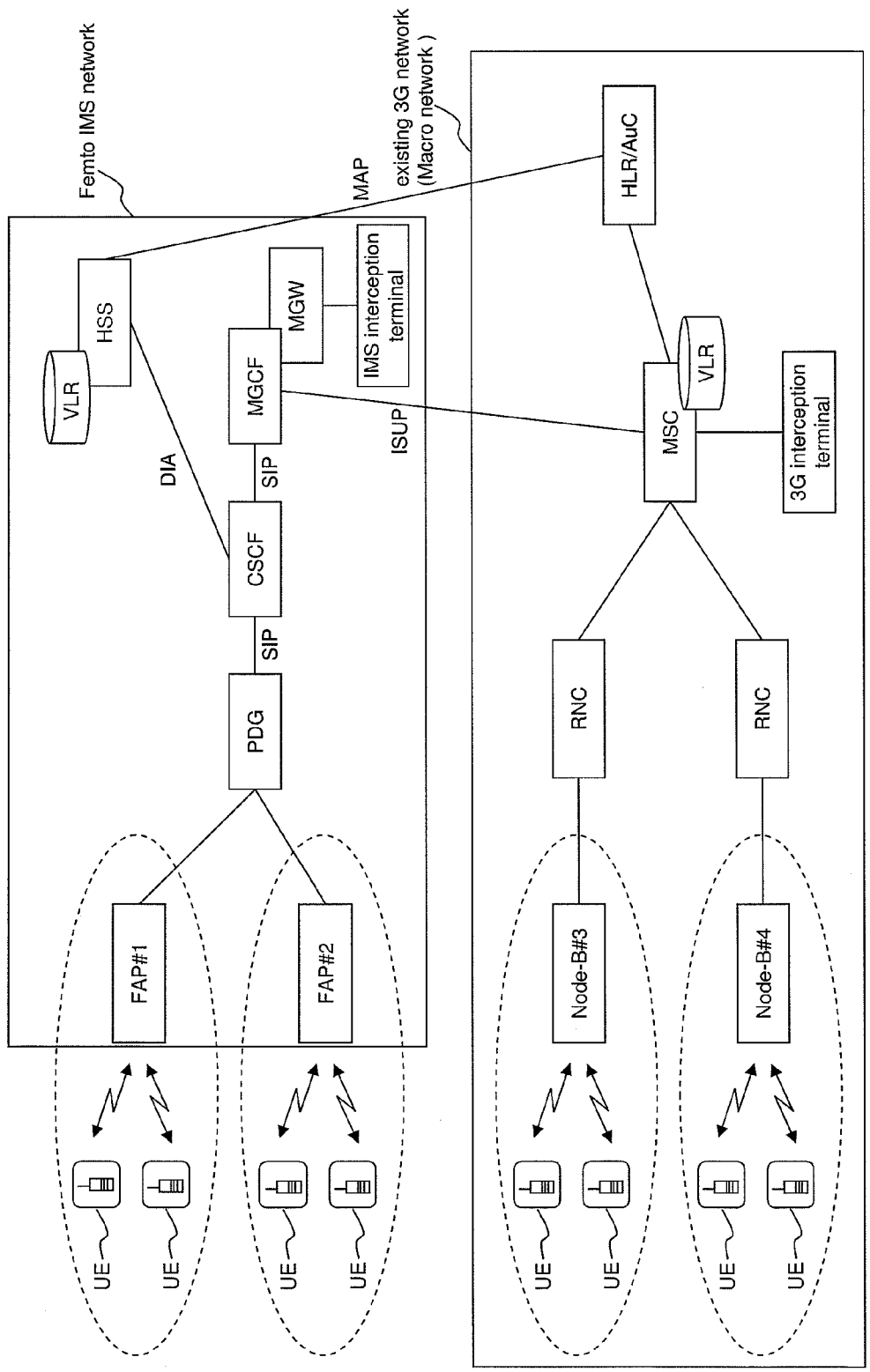
FIG. 1 is a diagram showing a system configuration example of a first exemplary embodiment of a communication system of the present invention.
Figure 2:
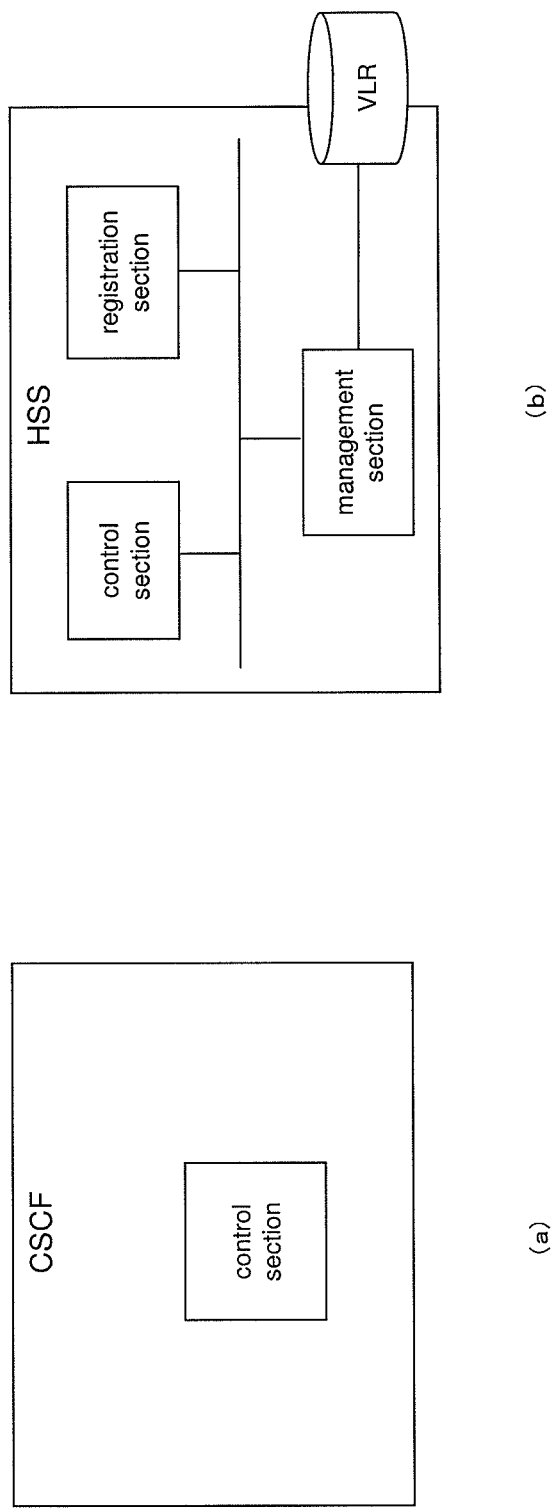
FIG. 2 is a block diagram showing examples of the configurations of a CSCF and an HSS shown in FIG. 1, in which (a) is a block diagram showing an example of the configuration of the CSCF, and (b) is a block diagram showing an example of the configuration of the HSS.

FIG. 2 is a block diagram showing examples of the configurations of the CSCF and the HSS shown in FIG. 1, in which (a) is a block diagram showing an example of the configuration of the CSCF, and (b) is a block diagram showing an example of the configuration of the HSS.

The CSCF shown in FIG. 1 is provided with a control section as shown in FIG. 2(a).

The CSCF is a control apparatus that functions as a main node in the IMS network, and it performs session control, management, routing and the like using SIP. The CSCF performs communication using the SIP and Diameter (DIA) protocols. For example, the CSCF performs communication with the MGCF using SIP and performs communication with the HSS using Diameter.

The HSS is a management apparatus which manages subscriber information about UEs to be used in the IMS.

The HSS shown in FIG. 1 is provided with a control section, a management section and a registration section as shown in FIG. 2(b).

The HSS performs communication using the MAP and Diameter protocols. For example, the HSS performs communication with the HLR/AuC using MAP and performs communication with the CSCF and the MGCF using Diameter. The details of the operations of the control section, the management section and the registration section, which the HSS is provided with, will be described in processing operation examples to be described later.

The VLR is an apparatus which stores subscriber information about the UEs. The HSS acquires subscriber information about a UE from HLR/AuC and stores the acquired subscriber information about the UE into the VLR and manages the information.

The MGCF is a relay control apparatus which controls communication by the MGW with protocols such as MEGACO (MEdia GAteway COntrol). The MGCF performs communication using the SIP and ISUP (ISdn User Part) protocols. For example, the MGCF performs communication with the CSCF using SIP and performs communication with the MSC using ISUP.

The MGW is a relay apparatus which relays information transmitted and received between the MGCF in the Femto IMS network and the MSC in the existing 3G network (Macro network). The MGW also intercepts voice communication in the Femto IMS network.

The MGW intercepts voice communication on the basis of specified monitoring conditions. The monitoring conditions include sending and receiving numbers of UEs, a channel number, IMS interception terminal information (IP address and port number) and the like. The monitoring conditions can be registered not only in advance but also after start of communication. The MGW intercepts voice communication corresponding to the monitoring conditions (the sending and receiving numbers of UEs and the channel number), and notifies the intercepted voice communication to an IMS interception terminal corresponding to the monitoring conditions (the IMS interception terminal information).

The IMS interception terminal is a terminal which intercepts voice communication which passes through the Femto IMS network. By information about the IMS interception terminal, such as the IP address and the port number, being registered with the MGW, the IMS interception terminal can intercept voice communication intercepted at the MGW.

<Processing Operation Examples>

Next, description will be made on a processing operation example of the communication system of this exemplary embodiment. In the processing operation example below, processing operations about a communication interception function will be described.

<CS (Circuit Switching) Sending Sequence Performed Between UEs in the Femto IMS Network (in the Case where there is No Communication Interception Target Terminal)>

Figure 3:
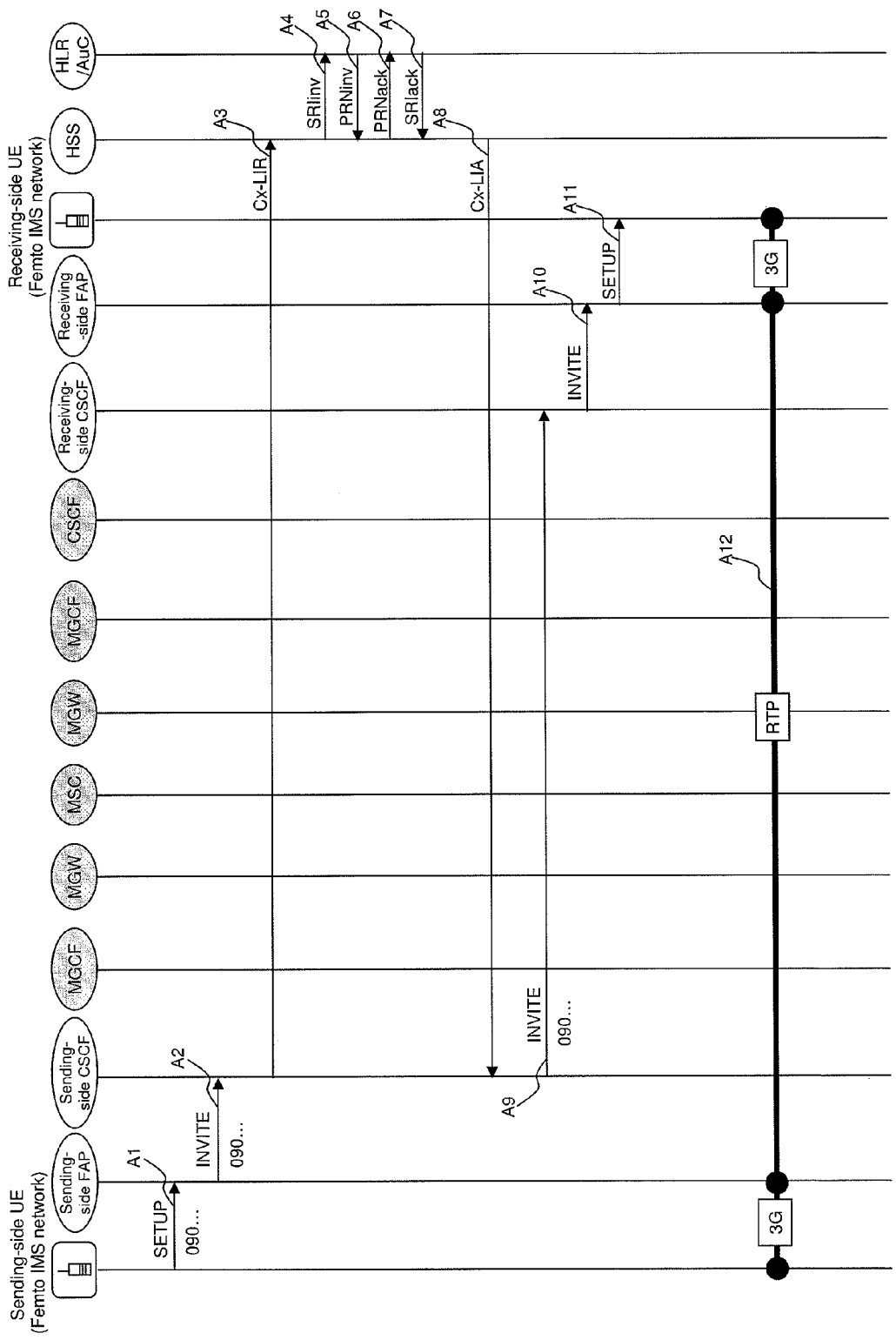
FIG. 3 is a diagram showing a CS (Circuit Switching) sending sequence performed between UEs in a Femto IMS network (in the case where there is no communication interception target terminal).

First, description will be made on a processing operation example at the time of CS sending performed between UEs in the Femto IMS network with reference to FIG. 3. FIG. 3 shows processing operations at the normal time when a UE on the sending side and a UE on the receiving side are not communication interception target terminals. Hereinafter, the UE on the sending side will be referred to as a sending-side UE, and the UE on the receiving side will be referred to as a receiving-side UE. Similarly, the FAP on the sending side will be referred to as a sending-side FAP, and the FAP on the receiving side will be referred to as a receiving-side FAP. Similarly, the CSCF on the sending side will be referred to as a sending-side CSCF, and the CSCF on the receiving side will be referred to as a receiving-side CSCF.

The sending-side UE transmits SETUP to the sending-side FAP (step A1).

The sending-side FAP transmits INVITE to the sending-side CSCF (step A2).

When receiving the INVITE, the control section of the sending-side CSCF transmits a Cx-LIR (Location-Info-Request) to the HSS if, on the basis of subscriber profiles registered with the sending-side CSCF, the received INVITE is not sent from a communication interception target terminal (step A3).

When receiving the Cx-LIR, the control section of the HSS transmits an SRI (Send Routing Information) invocation to the HLR/AuC if, on the basis of the subscriber information managed by the VLR, the receiving-side UE is not a communication interception target terminal and exists in the Femto IMS (step A4).

When receiving the SRI invocation, the HLR/AuC transmits a PRN (Provide Roaming Number) invocation to the HSS (step A5).

When receiving the PRN invocation, the HSS transmits PRN ack to the HLR/AuC (step A6).

When receiving the PRN ack, the HLR/AuC transmits SRI ack to the HSS (step A7).

Through the operations of steps A4 to A7 described above, the HSS inquires of the HLR/AuC about the location of the receiving-side UE and acquires the location of the receiving-side UE from the HLR/AuC.

When receiving the SRI ack, the HSS transmits a Cx-LIA (Location-Info-Answer) to the sending-side CSCF (step A8).

When receiving the Cx-LIA, the sending-side CSCF identifies the location of the receiving-side UE and the like on the basis of information of the received Cx-LIA and transmits INVITE to the receiving-side CSCF (step A9).

When receiving the INVITE, the receiving-side CSCF transmits the INVITE to the receiving-side FAP (step A10).

When receiving the INVITE, the receiving-side FAP transmits SETUP to the receiving-side UE (step A11).

Thereby, voice communication is performed between the sending-side UE and the receiving-side UE (step A12).

Voice communication between the sending-side UE and the receiving-side UE is performed via the sending-side UE, the sending-side FAP, the PDG, the receiving-side FAP and the receiving-side UE. That is, voice communication between the sending-side UE and the receiving-side UE is communication closed in the Femto IMS network. Between the UEs and the FAPs, 3G communication is performed, and RTP communication is performed between the FAPs.

As described above, since voice communication does not pass through the MGW in the sequence in FIG. 3, it is not possible to intercept voice communication between the sending-side UE and the receiving-side UE.

<CS Sending Sequence Performed Between UEs in the Femto IMS Network (in the Case where a Sending-Side UE is a Communication Interception Target Terminal)>

Next, description will be made on a processing operation example in the case where a sending-side UE existing in the Femto IMS network is a communication interception target terminal, with reference to FIG. 4.

Figure 4:
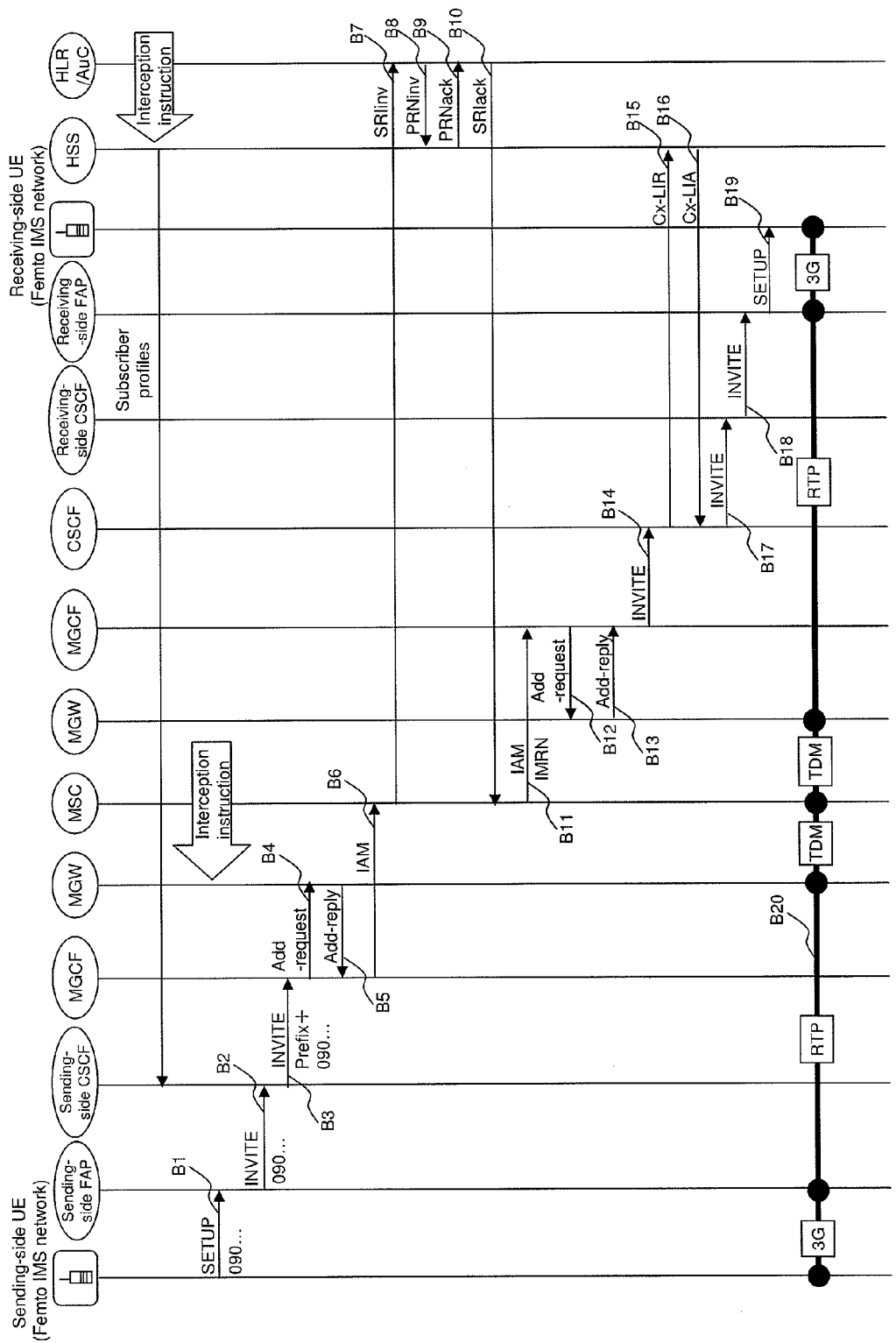
FIG. 4 is a diagram showing a CS sending sequence performed between UEs in the Femto IMS network (in the case where the sending-side UE is a communication interception target terminal).

In the sequence shown in FIG. 4, it is assumed that an "interception instruction" for specifying a UE on the CS sending side (a sending-side UE) as a communication interception target terminal has been issued to the HSS and the MGW.

When the "interception instruction" is issued, the MGW manages the sending-side UE as a communication interception target terminal.

When the "interception instruction" is issued, the management section of the HSS manages the sending-side UE as a communication interception target terminal. Then, the registration section of the HSS registers information to the effect that the sending-side UE is a communication interception target terminal, with a CSCF which controls communication of the sending-side UE (a sending-side CSCF) as a "subscriber profile". Specifically, the registration section of the HSS registers information about the UE specified by the "interception instruction" (a specified call registration number) with an appropriate CSCF as a "subscriber profile" at the time of registering the location of the UE or at the time of changing the subscriber data of the UE. The timing of performing the "interception instruction" is not especially limited and may be externally specified.

The sequence shown in FIG. 4 will be described on the assumption that the above "interception instruction" has been issued.

The sending-side UE transmits SETUP to the sending-side FAP (step B1).

The sending-side FAP transmits INVITE to the sending-side CSCF (step B2).

When receiving the INVITE, the control section of the sending-side CSCF gives a prefix to the receiving number and routes the INVITE to the MGCF if, on the basis of subscriber profiles registered with the sending-side CSCF, the received INVITE is sent from a communication interception target terminal (step B3).

When receiving the INVITE, the MGCF transmits an Add-request to the MGW (step B4).

When receiving the Add-request, the MGW transmits an Add-reply to the MGCF (step B5).

When receiving the Add-reply, the MGCF transmits an IAM (Initial Address Message) to the MSC (step B6).

When receiving the IAM, the MSC transmits an SRI invocation to the HLR/AuC (step B7).

When receiving the SRI invocation, the HLR/AuC transmits a PRN invocation to the HSS (step B8).

When receiving the PRN invocation, the HSS transmits PRN ack to the HLR/AuC (step B9).

When receiving the PRN ack, the HLR/AuC transmits SRI ack to the MSC (step B10).

When receiving the SRI ack, the MSC transmits an JAM to the MGCF (step B11). At this time, the MSC transmits an JAM including an IMRN (IP Multimedia Routing Number) to the MGCF.

When receiving the IAM, the MGCF transmits an Add-request to the MGW (Step B12).

When receiving the Add-request, the MGW transmits an Add-reply to the MGCF (step B13).

When receiving the Add-reply, the MGCF transmits INVITE to the CSCF (step B14).

When receiving the INVITE, the CSCF transmits a Cx-LIR to the HSS (step B15).

When receiving the Cx-LIR, the HSS transmits a Cx-LIA to the CSCF (step B16).

When receiving the Cx-LIA, the CSCF transmits INVITE to the receiving-side CSCF (step B17).

When receiving the INVITE, the receiving-side CSCF transmits the INVITE to the receiving-side FAP (step B18).

When receiving the INVITE, the receiving-side FAP transmits SETUP to the receiving-side UE (Step B19).

Thereby, voice communication is performed between the sending-side UE and the receiving-side UE (step B20).

Voice communication between the sending-side UE and the receiving-side UE is performed via the sending-side UE, the sending-side FAP, the MGW, the MSC, the MGW, the receiving-side FAP and the receiving-side UE. That is, the Femto IMS network and the existing 3G network are mutually connected, and voice communication between the sending-side UE and the receiving-side UE is communication via the Femto IMS network and the existing 3G network.

Between the UEs and the FAPs, 3G communication is performed. Between the FAPs and the MGW, RTP communication is performed. Between the MGW and the MSC, TDM (Time Division Multiple) communication is performed.

As described above, if the sending-side UE is a communication interception target terminal, the sending-side CSCF gives a prefix to the receiving number and routes INVITE to the MGCF so that voice communication is controlled to pass through the MGW. Thereby, voice communication between the sending-side UE and the receiving-side UE can be intercepted.

<CS Sending Sequence Performed Between UEs in the Femto IMS Network (in the Case where a Receiving-Side UE is a Communication Interception Target Terminal)>

Next, description will be made on a processing operation example in the case where a receiving-side UE existing in the Femto IMS network is a communication interception target terminal, with reference to FIG. 5.

Figure 5:
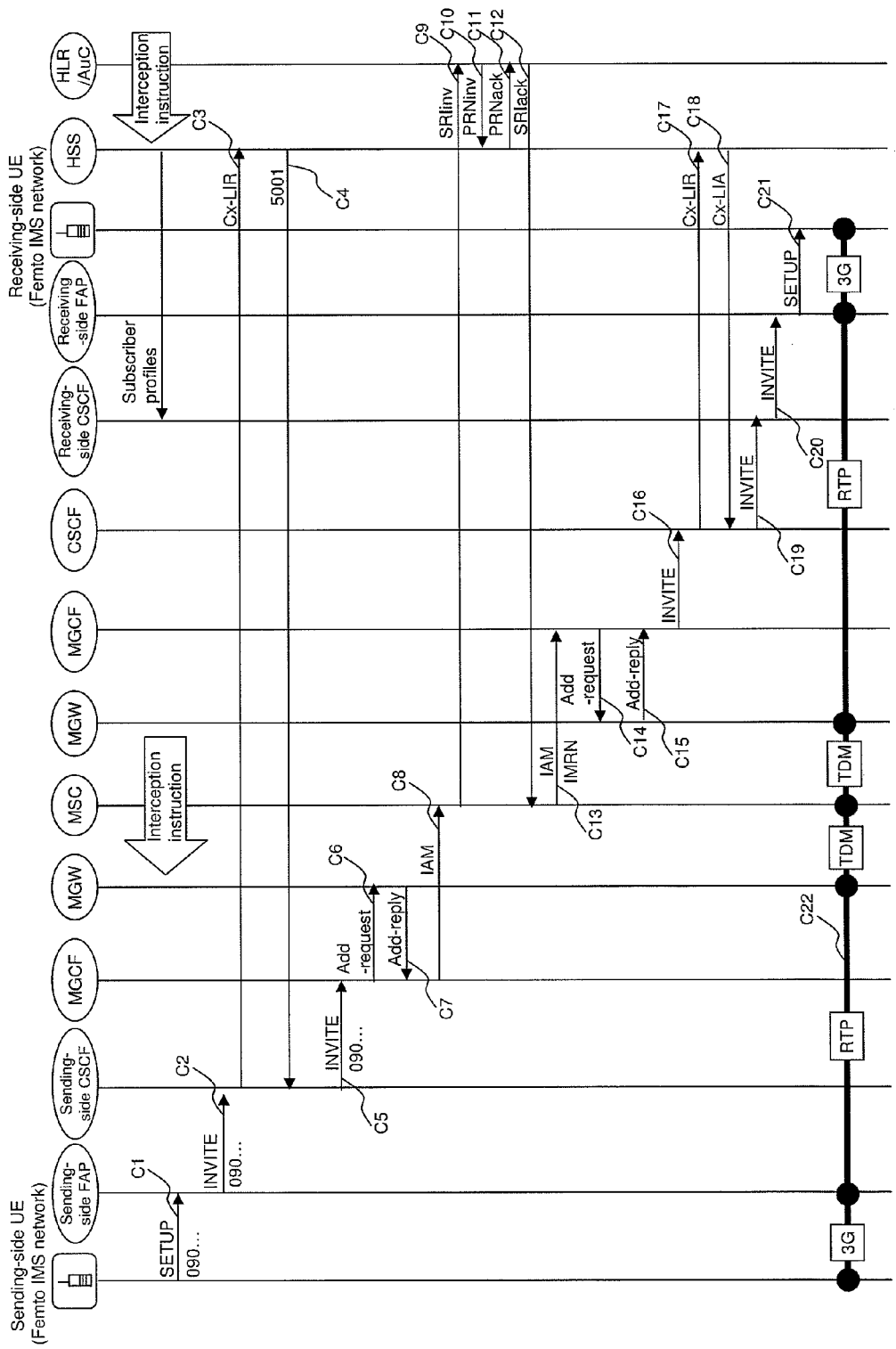
FIG. 5 is a diagram showing a CS sending sequence performed between UEs in the Femto IMS network (in the case where the receiving-side UE is a communication interception target terminal).

In the sequence shown in FIG. 5, it is assumed that an "interception instruction" for specifying a UE on the CS receiving side (a receiving-side UE) as a communication interception target terminal has been issued to the HSS and the MGW.

When the "interception instruction" is issued, the MGW manages the receiving-side UE as a communication interception target terminal.

When the "interception instruction" is issued, the management section of the HSS manages the receiving-side UE as a communication interception target terminal. Then, the registration section of the HSS registers information to the effect that the receiving-side UE is a communication interception target terminal, with a CSCF which controls communication of the receiving-side UE (a receiving-side CSCF) as a "subscriber profile".

The sequence shown in FIG. 5 will be described on the assumption that the above "interception instruction" has been issued.

The sending-side UE transmits SETUP to the sending-side FAP (step C1).

The sending-side UE transmits INVITE to the sending-side CSCF (step C2).

When receiving the INVITE, the control section of the sending-side CSCF transmits a Cx-LIR to the HSS if, on the basis of subscriber profiles registered with the sending-side CSCF, the received INVITE is not sent from a communication interception target terminal (step C3).

When receiving Cx-LIR, the control section of the HSS does not transmit an SRI invocation to the HLR/AuC but transmits DIAMETER ERROR USER UNKNOWN (5001) to the sending-side CSCF if, on the basis of the subscriber information managed by the VLR, the receiving-side UE is a communication interception target terminal and exists in the Femto IMS (step C4).

When receiving 5001, the sending-side CSCF transmits INVITE to the MGCF (step C5).

When receiving the INVITE, the MGCF transmits an Add-request to the MGW (step C6).

When receiving the Add-request, the MGW transmits an Add-reply to the MGCF (step C7).

When receiving the Add-reply, the MGCF transmits an IAM to the MSC (step C8).

When receiving the IAM, the MSC transmits an SRI invocation to the HLR/AuC (step C9). At steps C10 to C21, processing similar to the processing at steps B8 to B19 shown in FIG. 4 is performed.

Thereby, voice communication is performed between the sending-side UE and the receiving-side UE (step C22).

Voice communication between the sending-side UE and the receiving-side UE is performed via the sending-side UE, the sending-side FAP, the MGW, the MSC, the MGW, the receiving-side FAP and the receiving-side UE. That is, the Femto IMS network and the existing 3G network are mutually connected, and voice communication between the sending-side UE and the receiving-side UE is communication via the Femto IMS network and the existing 3G network.

Between the UEs and the FAPs, 3G communication is performed. Between the FAPs and the MGW, RTP communication is performed. Between the MGW and the MSC, TDM communication is performed.

As described above, when the receiving-side UE is a communication interception target terminal, the HSS transmits 5001 to the sending-side CSCF to route it to the existing 3G network so that voice communication is controlled to pass through the MGW. Thereby, voice communication between the sending-side UE and the receiving-side UE can be intercepted.

<CS Sending Sequence Performed Between a UE in the Femto IMS Network and a UE in the Existing 3G Network (in the Case where there is No Communication Interception Target Terminal)>

Figure 6:
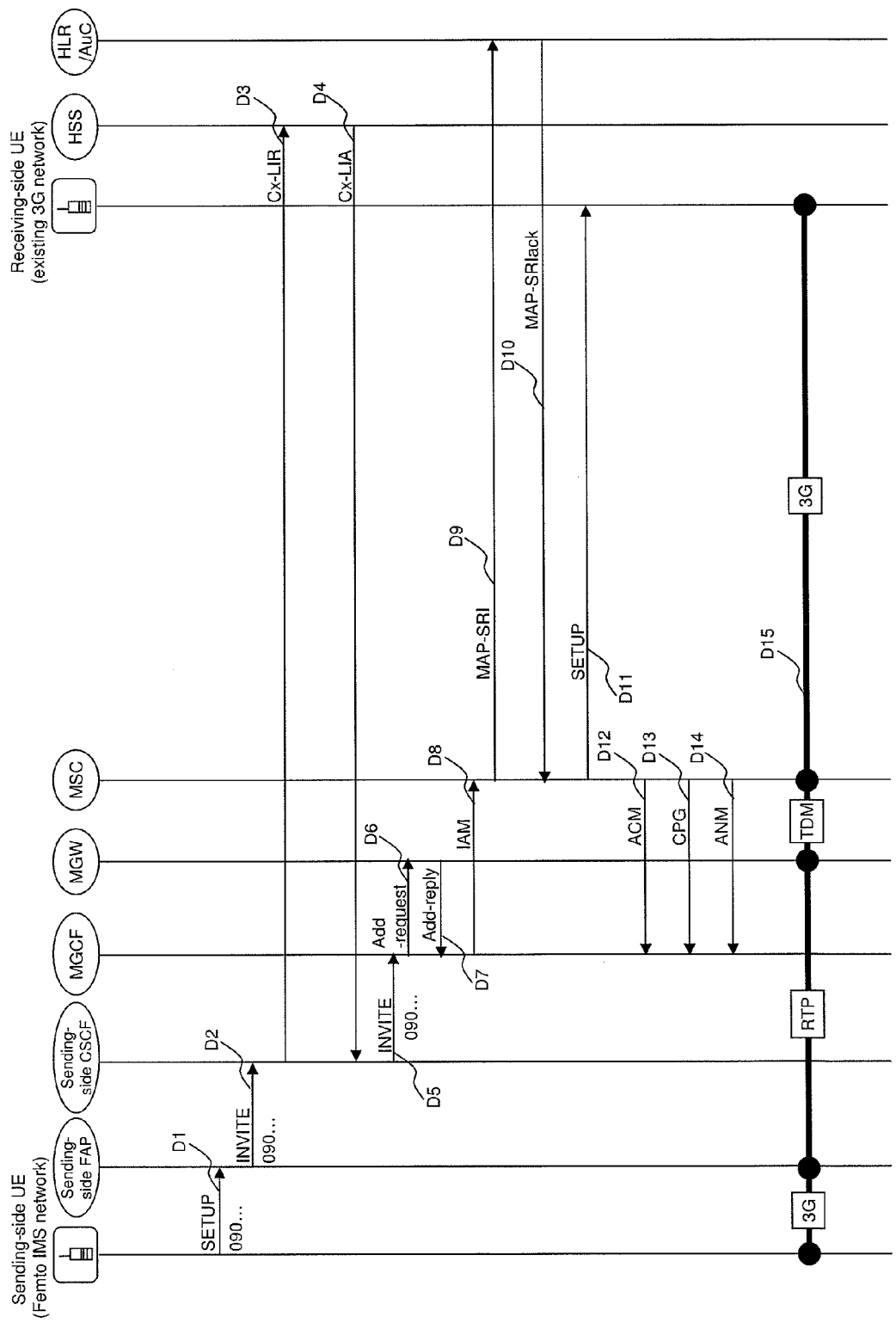
FIG. 6 is a diagram showing a CS sending sequence performed between a UE in the Femto IMS network and a UE in an existing 3G network (in the case where there is no communication interception target terminal).

Next, description will be made on an example of processing operations performed between a UE in the Femto IMS network and a UE in the existing 3G network at the time of CS sending, with reference to FIG. 6. FIG. 6 shows processing operations at the normal time when a sending-side UE and a receiving-side UE are not communication interception target terminals.

The sending-side UE transmits SETUP to the sending-side FAP (step D1).

The sending-side FAP transmits INVITE to the sending-side CSCF (step D2).

When receiving the INVITE, the control section of the sending-side CSCF transmits a Cx-LIR to the HSS if, on the basis of subscriber profiles registered with the sending-side CSCF, the received INVITE is not sent from a communication interception target terminal (step D3).

When receiving the Cx-LIR, the control section of the HSS transmits a Cx-LIA to the sending-side CSCF if, on the basis of the subscriber information managed by the VLR, the receiving-side UE is not a communication interception target terminal and exists in the existing 3G network (step D4).

When receiving the Cx-LIA, the sending-side CSCF transmits INVITE to the MGCF (step D5).

When receiving the INVITE, the MGCF transmits an Add-request to the MGW (step D6).

When receiving the Add-request, the MGW transmits an Add-reply to the MGCF (step D7).

When receiving the Add-reply, the MGCF transmits an IAM to the MSC (step D8).

When receiving the IAM, the MSC transmits an MAP-SRI to the HLR/AuC (step D9).

When receiving the MAP-SRI, the HLR/AuC transmits MAP-SRIack to the MSC (step D10).

When receiving the MAP-SRI ack, the MSC transmits SETUP to the receiving-side UE in the existing 3G network (step D11).

The MSC also transmits an ACM (Address Complete Message), a CPG (Call Progress Message) and an ANM (Answer Message) to the MGCF (step D12 to D14).

Thereby, voice communication is performed between the sending-side UE and the receiving-side UE (step D15).

Voice communication between the sending-side UE and the receiving-side UE is performed via the sending-side UE, the sending-side FAP, the MGW, the MSC and the receiving-side UE. That is, the Femto IMS network and the existing 3G network are mutually connected, and voice communication between the sending-side UE and the receiving-side UE is communication via the Femto IMS network and the existing 3G network.

Between the sending-side UE and the FAP, 3G communication is performed. Between the FAPs and the MGW, RTP communication is performed. Between the MGW and the MSC, TDM communication is performed. Between the MSC and the receiving-side UE, 3G communication is performed.

As described above, since voice communication passes through the MGW in the sequence in FIG. 6, it is possible to intercept voice communication between the sending-side UE and the receiving-side UE.

<CS Sending Sequence Performed Between a UE in the Femto IMS Network and a UE in the Existing 3G Network (in the Case where the Sending-Side UE is a Communication Interception Target Terminal)>

Next, description will be made on a processing operation example in the case where a sending-side UE existing in the Femto IMS network is a communication interception target terminal, with reference to FIG. 7.

Figure 7:
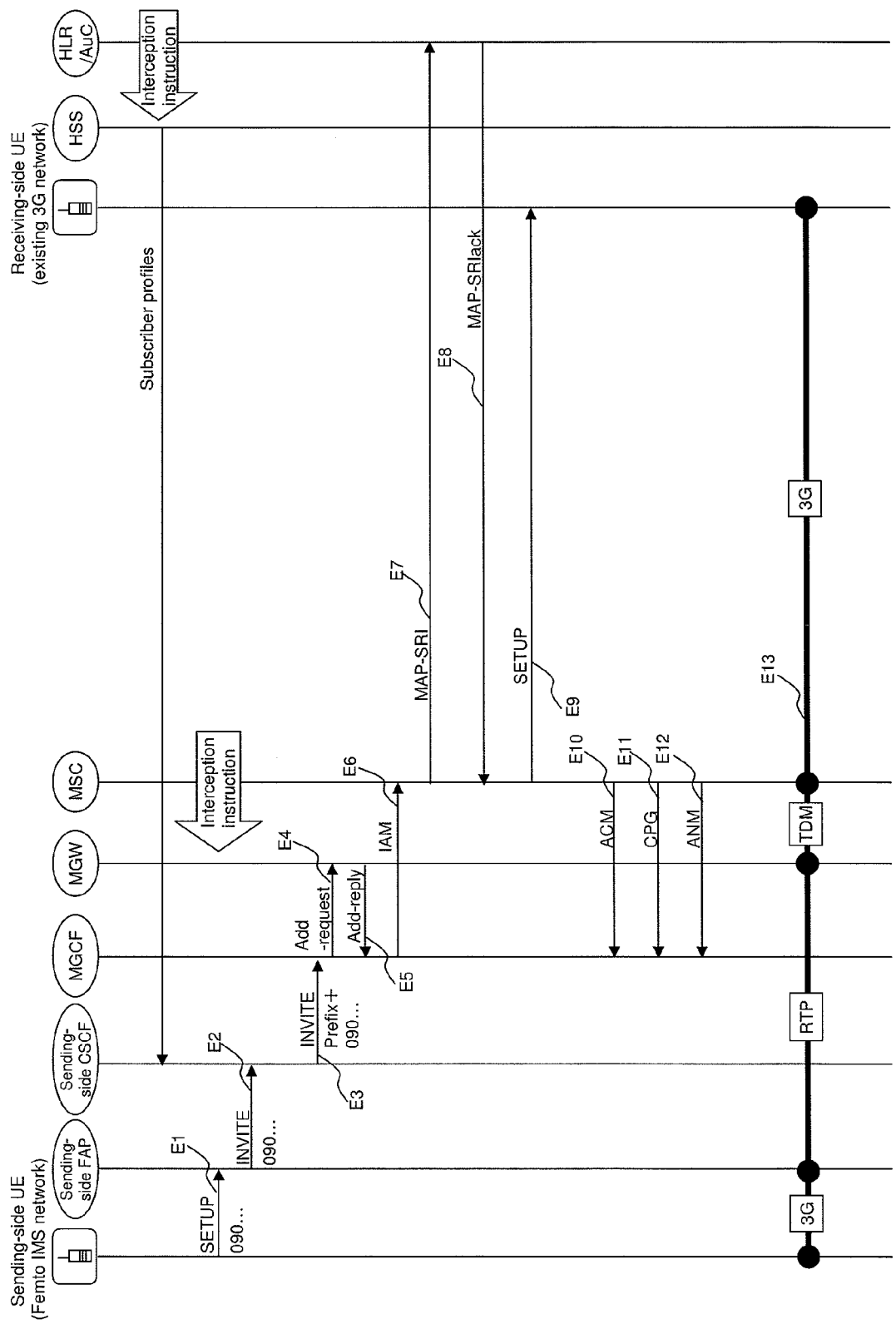
FIG. 7 is a diagram showing a CS sending sequence performed between a UE in the Femto IMS network and a UE in the existing 3G network (in the case where the sending-side UE is a communication interception target terminal).

In the sequence shown in FIG. 7, it is assumed that an "interception instruction" for specifying a UE on the CS sending side (a sending-side UE) as a communication interception target terminal has been issued to the HSS and the MGW.

When the "interception instruction" is issued, the MGW manages the sending-side UE as a communication interception target terminal.

When the "interception instruction" is issued, the management section of the HSS manages the sending-side UE as a communication interception target terminal. Then, the registration section of the HSS registers information to the effect that the sending-side UE is a communication interception target terminal, with a CSCF which controls communication of the sending-side UE (a sending-side CSCF) as a "subscriber profile". Specifically, the registration section of the HSS registers information about the UE targeted by the command (a specified call registration number) with an appropriate CSCF as a "subscriber profile" at the time of registering the location of the UE or at the time of changing the subscriber data of the UE.

The sequence shown in FIG. 7 will be described on the assumption that the above "interception instruction" has been issued.

Processing at steps E1 to E6 is similar to processing at steps B1 to B6 shown in FIG. 4.

When receiving the IAM, the MSC transmits an MAP-SRI to the HLR/AuC (step E7).

When receiving the MAP-SRI, the HLR/AuC transmits MAP-SRIack to the MSC (step E8).

When receiving the MAP-SRI ack, the MSC transmits SETUP to the receiving-side UE in the existing 3G network (step E9).

The MSC transmits an ACM, a CPG and an ANM to the MGCF (steps E10 to E12).

Thereby, voice communication is performed between the sending-side UE and the receiving-side UE (step E13).

Voice communication between the sending-side UE and the receiving-side UE is performed via the sending-side UE, the sending-side FAP, the MGW, the MSC and the receiving-side UE. That is, the Femto IMS network and the existing 3G network are mutually connected, and voice communication between the sending-side UE and the receiving-side UE is communication via the Femto IMS network and the existing 3G network.

Between the sending-side UE and the FAP, 3G communication is performed. Between the FAPs and the MGW, RTP communication is performed. Between the MGW and the MSC, TDM communication is performed. Between the MSC and the receiving-side UE, 3G communication is performed.

As described above, since voice communication passes through the MGW in the sequence in FIG. 7, it is possible to intercept voice communication between the sending-side UE and the receiving-side UE.

<CS Sending Sequence Performed Between a UE in the Femto IMS Network and a UE in the Existing 3G Network (in the Case where the Receiving-Side UE is a Communication Interception Target Terminal)>

Next, description will be made on a processing operation example in the case where a receiving-side UE existing in the existing 3G network is a communication interception target terminal, with reference to FIG. 8.

Figure 8:
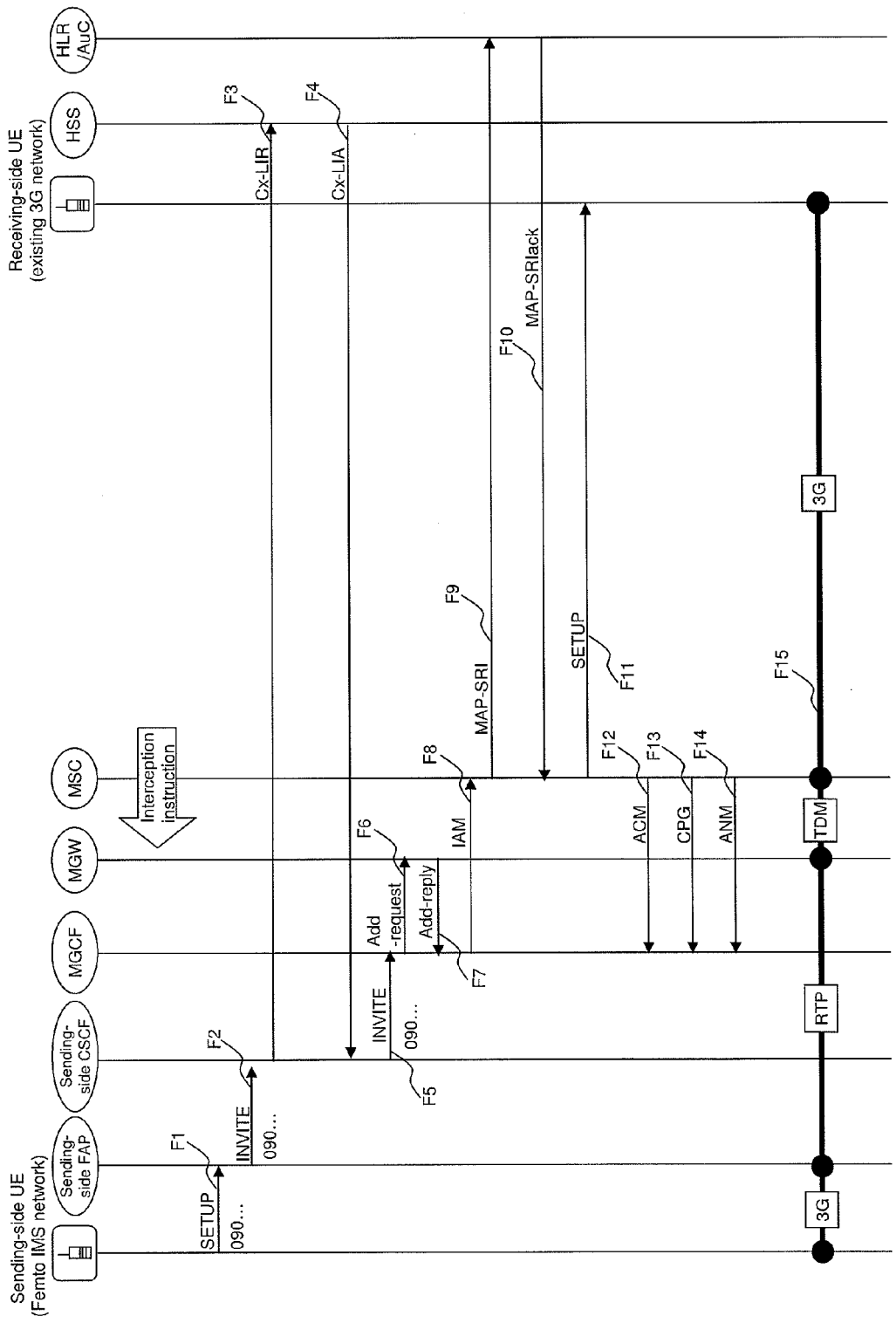
FIG. 8 is a diagram showing a CS sending sequence performed between a UE in the Femto IMS network and a UE in the existing 3G network (in the case where the sending-side UE is a communication interception target terminal).

Processing at steps F1 to F14 in the sequence shown in FIG. 8 is similar to processing at steps D1 to D14 in the sequence shown in FIG. 6. Thereby, voice communication is performed between the sending-side UE and the receiving-side UE (step F15).

Voice communication between the sending-side UE and the receiving-side UE is performed via the sending-side UE, the sending-side FAP, the MGW, the MSC and the receiving-side UE. That is, the Femto IMS network and the existing 3G network are mutually connected, and voice communication between the sending-side UE and the receiving-side UE is communication via the Femto IMS network and the existing 3G network.

Between the sending-side UE and the FAP, 3G communication is performed. Between the FAPs and the MGW, RTP communication is performed. Between the MGW and the MSC, TDM communication is performed. Between the MSC and the receiving-side UE, 3G communication is performed.

As described above, since voice communication passes through the MGW in the sequence in FIG. 8, it is possible to intercept voice communication between the sending-side UE and the receiving-side UE.

<Operation/Advantages>

As described above, in the communication system of this exemplary embodiment, when receiving an establishment request (Cx-LIR) for establishing an information communication path between a sending-side UE and a receiving-side UE, the HSS which manages information about UEs existing under the FAP performs control so as to establish the information communication path between the sending-side UE and the receiving-side UE via the MGW and the existing 3G network if the receiving-side UE exists in the Femto IMS network and if it is a communication interception target terminal (see FIG. 5).

If the receiving-side UE does not exist in the Femto IMS network and it is a communication interception target terminal, then the HSS performs control so as to establish the information communication path between the sending-side UE and the receiving-side UE via the MGW and the existing 3G network (see FIG. 8).

That is, if the receiving-side UE is a communication interception target terminal, the HSS performs control so as to establish the information communication path between the sending-side UE and the receiving-side UE via the MGW and the existing 3G network irrespective of whether the receiving-side UE exists in the Femto IMS network or in the existing 3G network.

Therefore, it is possible to, taking into consideration the mutual connection between the Femto IMS network and the existing 3G network, realize a communication interception function similar to the communication interception function provided in the existing 3G network, in the Femto IMS network introducing an FAP.

Furthermore, in the communication system of this exemplary embodiment, when receiving an establishment request (INVITE) for establishing an information communication path between a sending-side UE and a receiving-side UE, the CSCF which controls communication of UEs existing under the FAP performs control so as to establish the information communication path between the sending-side UE and the receiving-side UE via the MGW and the existing 3G network if the sending-side UE is a communication interception target terminal.

Therefore, it is possible to, taking into consideration the mutual connection between the Femto IMS network and the existing 3G network, realize a communication interception function similar to the communication interception function provided in the existing 3G network, in the Femto IMS network introducing an FAP.

Furthermore, in this exemplary embodiment, it is possible to realize a communication interception function in the Femto IMS network without improving terminal apparatuses such as the UE and the FAP. Furthermore, it is possible to realize the communication interception function in the Femto IMS network without placing any new load on the terminal apparatuses such as the UE and the FAP.

Second Exemplary Embodiment

Next, a second exemplary embodiment of the communication system of the present invention will be described.

In the first exemplary embodiment described above, in consideration of mutual connection between a Femto IMS network and a existing 3G network, a communication interception function similar to the communication interception function provided in the existing 3G network is realized in the Femto IMS network introducing an FAP.

Figure 9:
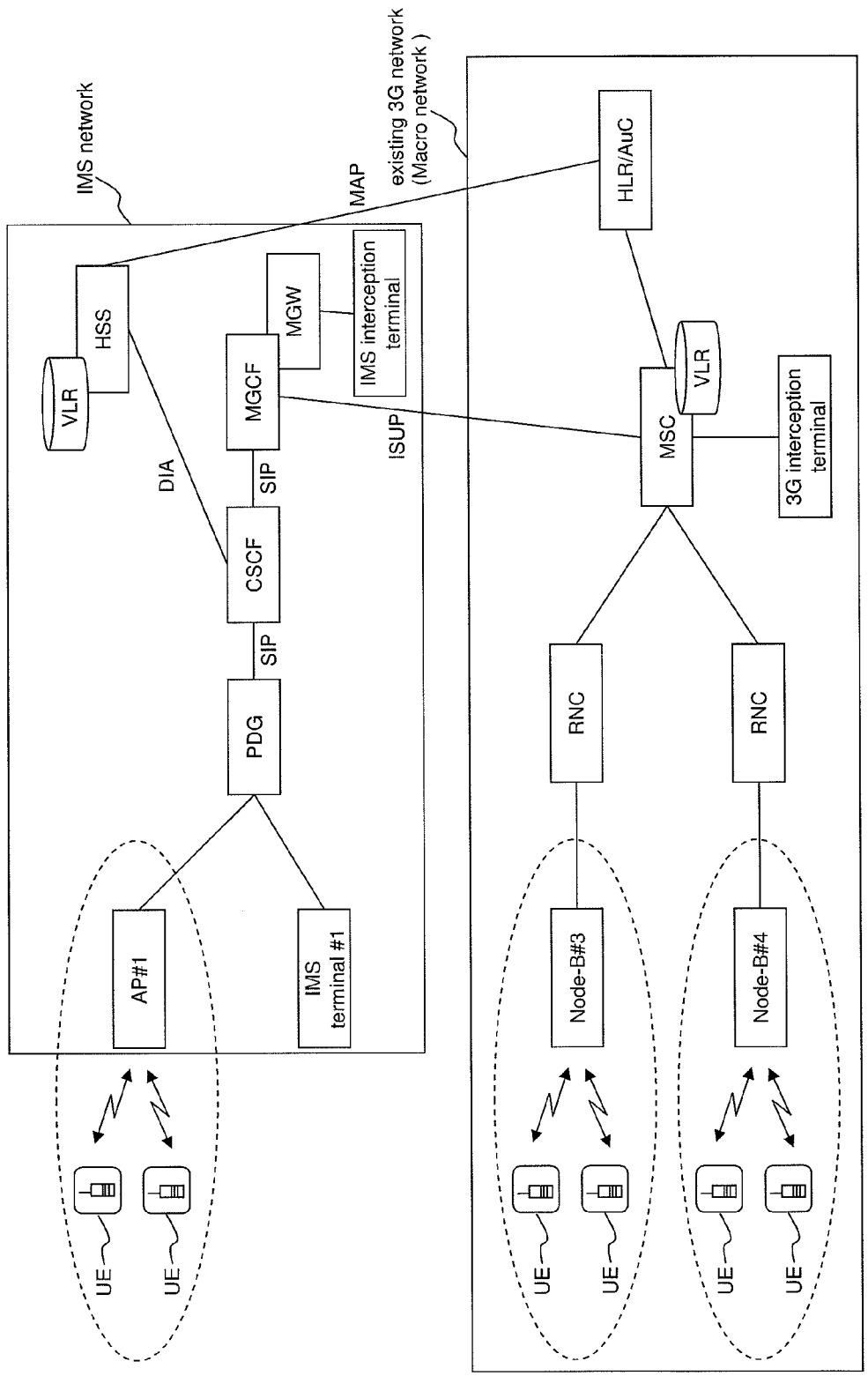
FIG. 9 is a diagram showing a system configuration example of a second exemplary embodiment of a communication system of the present invention.

Here, in the communication system including an IMS network and an existing 3G network, which is shown in FIG. 9, it is also possible to, taking into consideration the mutual connection between an IMS network and a existing 3G network, realize a communication interception function similar to the communication interception function provided in the existing 3G network, in the IMS network, similarly to the first exemplary embodiment.

For example, it is assumed that the UEs shown in FIG. 9 are dual-type UEs capable of performing communication in a 3G network and in a WLAN (Wireless Local Area Network) network. In this case, when existing in the 3G network, the UE catches 3G radio waves and connects to the core network of the 3G network via a Node-B. On the other hand, when existing in the WLAN network under an AP (Access Point), the UE catches WLAN radio waves and connects to the core network of the IMS network via a PDG.

The IMS terminals (fixed SIP phone type) shown in FIG. 9 connect to the core network of the IMS network via the PDG In this system configuration shown in FIG. 9 also, it is possible to realize a communication interception function similar to the communication interception function provided in the existing 3G network, in the IMS network by performing processing operations similar to those of the first exemplary embodiment.

The first and second exemplary embodiments described above are preferred exemplary embodiments, and the scope of the present invention is not limited only to the first and second exemplary embodiments described above. The present invention can be practiced in exemplary embodiments in which various modifications are made, within the scope without departing from the spirit of the present invention. For example, the present invention does not depend on the version of 3GPP.

The communication system of the present invention may be any system if communication is mutually performed between an IMS network and a 3G network therein. By performing the processing operations described above in the IMS network, a communication interception function similar to the communication interception function provided in the existing 3G network can be realized in the IMS network.

The control operation of each of the apparatuses constituting the communication systems in the first and second exemplary embodiments described above can be executed by hardware, software, or a configuration including both hardware and software.

In the case of executing processing using software, a program in which a processing sequence is recorded can be installed in a memory in a computer incorporated in dedicated hardware and executed. Alternatively, the program can be installed in a general-purpose computer capable of executing various processing and executed.

For example, the program can be recorded in a hard disk or a ROM (Read Only Memory) as a recording medium in advance. Alternatively, the program can be temporarily or permanently stored (recorded) in a removable recording medium. Such a removable recording medium can be provided as so-called package software. As the removable recording medium, a floppy (registered trademark) disk, CD-ROM (Compact Disc Read Only Memory), MO (Magneto optical) disk, DVD (Digital Versatile Disc), magnetic disk, semiconductor memory and the like are included.

The program may be installed in a computer from the removable medium as described above. The program may be wirelessly transferred to the computer from a download site. The program may be wiredly transferred to the computer via a network.

The communication system of the present invention can be constructed not only so as to perform time-series execution of the processing in accordance with the processing operations described above but also so as to perform parallel or individual execution of the processing according to the processing capacity of the apparatus which executes the processing or as needed.

The communication system of the present invention can be constructed in a configuration in which multiple apparatuses are logically combined or in a configuration in which the apparatuses exist in the same case.

The present invention is applicable to such a service in which communication is mutually performed between an IMS network and a 3G network.

The present invention has been described with reference to the exemplary embodiments. However, the present invention is not limited to the exemplary embodiments described above. Various modifications which can be understood by one skilled in the art can be made in the configuration and details of the present invention within the scope of the present invention.

This application claims priority based on Japanese Patent Application No. 2009-267494 filed on Nov. 25, 2009, the disclosure of which is hereby incorporated by reference thereto in its entirety.

The invention claimed is:

1. A management apparatus managing information about a communication terminal existing in an IMS (IP Multimedia Subsystem) network, comprising:
   a control circuit which, when accepting an establishment request for establishing an information communication path between a sending-side communication terminal and a receiving-side communication terminal, performs control so as to establish the information communication path between the sending-side communication terminal and the receiving-side communication terminal via a relay apparatus provided with a relay function for relaying communication between the IMS network and a 3G network, and provided with a communication interception function, and via the 3G network if the receiving-side communication terminal exists in the IMS network and is a communication interception target terminal,
   wherein the relay apparatus is an MGCF (Media Gateway Control Function) that may communicate with a CSCF (Call Session Control Function) using an ISUP (ISDN User Part) protocol; and
   a communication circuit that transmits/receives a message, wherein
   when accepting the establishment request from a sending-side control apparatus which controls communication of the sending-side communication terminal, the control circuit transmits a response indicating that the receiving-side communication terminal does not exist in the IMS network, to the sending-side control apparatus, and performs control so that the establishment request is notified to the management apparatus via the relay apparatus and the 3G network if the receiving-side communication terminal exists in the IMS network and is a communication interception target terminal.

2. The management apparatus according to claim 1, wherein
   the control circuit transmits the response to the sending-side control apparatus without making an inquiry to an HLR (Home Location Register) in the 3G network to inquire about the location where the receiving-side communication terminal exists.

3. The management apparatus according to claim 1, wherein
   when accepting the establishment request, the control circuit performs control so as to establish the information communication path not via the relay apparatus and the 3G network if the receiving-side communication terminal exists in the IMS network and is not a communication interception target terminal.

4. The management apparatus according to claim 1, wherein
   when accepting the establishment request, the control circuit performs control so as to establish the information communication path between the sending-side communication terminal and the receiving-side communication terminal via the relay apparatus and the 3G network if the receiving-side communication terminal does not exist in the IMS network and is a communication interception target terminal.

5. The management apparatus according to claim 1, comprising:
   a management circuit managing information about the communication interception target terminal; and
   a registration circuit registering the information about the communication interception target terminal with a control apparatus controlling communication of the communication interception target terminal as subscriber profile information; wherein
   at the time that location registration is performed when the communication interception target terminal exists in the IMS network, the registration circuit registers the subscriber profile information including the information about the communication interception target terminal with the control apparatus.

6. The management apparatus according to claim 5, wherein when the information about the communication interception target terminal is updated, the registration circuit registers the subscriber profile information including the updated information about the communication interception target terminal with the control apparatus.

7. The management apparatus according to claim 5, wherein the registration circuit adds a new parameter and registers the information about the communication interception target terminal with the control apparatus as the subscriber profile information.

8. A communication system configured to comprise at least communication terminals, a management apparatus managing information about a communication terminal existing in an IMS (IP Multimedia Subsystem) network, and a relay apparatus provided with a relay function of relaying communication between the IMS network and a 3G network, and a communication interception function, wherein the management apparatus comprises a control circuit which, when accepting an establishment request for establishing an information communication path between a sending-side communication terminal and a receiving-side communication terminal, performs control so as to establish the information communication path between the sending-side communication terminal and the receiving-side communication terminal via the relay apparatus and the 3G network if the receiving-side communication terminal exists in the IMS network and is a communication interception target terminal, wherein the relay apparatus is an MGCF (Media Gateway Control Function) that may communicate with a CSCF (Call Session Control Function) using an ISUP (ISDN User Part) protocol; and a communication circuit that transmits/receives a message, wherein when accepting the establishment request from a sending-side control apparatus which controls communication of the sending-side communication terminal, the control circuit transmits a response indicating that the receiving-side communication terminal does not exist in the IMS network, to the sending-side control apparatus, and performs control so that the establishment request is notified to the management apparatus via the relay apparatus and the 3G network if the receiving-side communication terminal exists in the IMS network and is a communication interception target terminal.

9. A control method by a management apparatus managing information about a communication terminal existing in an IMS (IP Multimedia Subsystem) network, comprising:

a control step of, when accepting an establishment request for establishing an information communication path between a sending-side communication terminal and a receiving-side communication terminal, performing control so as to establish the information communication path between the sending-side communication terminal and the receiving-side communication terminal via a relay apparatus provided with a relay function for relaying communication between the IMS network and a 3G network, and provided with a communication interception function, and via the 3G network if the receiving-side communication terminal exists in the IMS network and is a communication interception target terminal, wherein the relay apparatus is an MGCF (Media Gateway Control Function) that may communicate with a CSCF (Call Session Control Function) using an ISUP (ISDN User Part) protocol; and wherein when accepting the establishment request from a sending-side control apparatus which controls communication of the sending-side communication terminal, the control circuit transmits a response indicating that the receiving-side communication terminal does not exist in the IMS network, to the sending-side control apparatus, and performs control so that the establishment request is notified to the management apparatus via the relay apparatus and the 3G network if the receiving-side communication terminal exists in the IMS network and is a communication interception target terminal.

10. A non-transitory computer-readable recording medium storing a program to be executed by a management apparatus managing information about a communication terminal existing in an IMS (IP Multimedia Subsystem) network, the program causing a computer to execute:

a control process for, when accepting an establishment request for establishing an information communication path between a sending-side communication terminal and a receiving-side communication terminal, performing control so as to establish the information communication path between the sending-side communication terminal and the receiving-side communication terminal via a relay apparatus provided with a relay function for relaying communication between the IMS network and a 3G network, and provided with a communication interception function, and via the 3G network if the receiving-side communication terminal exists in the IMS network and is a communication interception target terminal, wherein the relay apparatus is an MGCF (Media Gateway Control Function) that may communicate with a CSCF (Call Session Control Function) using an ISUP (ISDN User Part) protocol; and wherein when accepting the establishment request from a sending-side control apparatus which controls communication of the sending-side communication terminal, the control circuit transmits a response indicating that the receiving-side communication terminal does not exist in the IMS network, to the sending-side control apparatus, and performs control so that the establishment request is notified to the management apparatus via the relay apparatus and the 3G network if the receiving-side communication terminal exists in the IMS network and is a communication interception target terminal.

* * * * *

UNITED STATES PATENT AND TRADEMARK OFFICE
CERTIFICATE OF CORRECTION

PATENT NO. : 9,014,089 B2  
APPLICATION NO. : 13/501545  
DATED : April 21, 2015  
INVENTOR(S) : Yusuke Miyagawa et al.

Page 1 of 1

It is certified that error appears in the above-identified patent and that said Letters Patent is hereby corrected as shown below:

In the specification

Column 1, Line 4: Below Title insert -- CROSS REFERENCE TO RELATED APPLICATIONS

This application is a National Stage of International Application No. PCT/JP2010/069427 filed November 1, 2010, claiming priority based on Japanese Patent Application No. 2009-267494 filed November 25, 2009, the contents of all of which are incorporated herein by reference in their entirety. --.

Column 9, Line 30: Delete "JAM" and insert -- IAM --.

Column 9, Line 32: Delete "JAM" and insert -- IAM --.

Signed and Sealed this  
Seventeenth Day of November, 2015

Michelle K. Lee  
*Director of the United States Patent and Trademark Office*